June 30, 1925.  
C. E. BURKE  
SNOW PUSHER  
Filed March 24, 1924
1,544,370
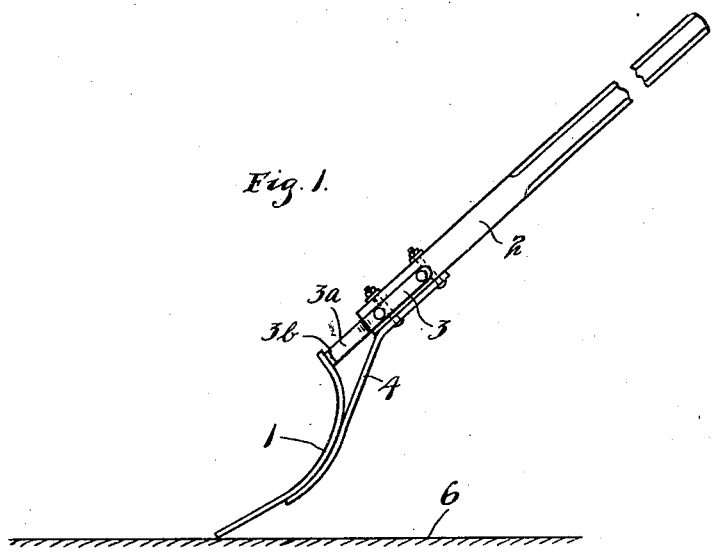
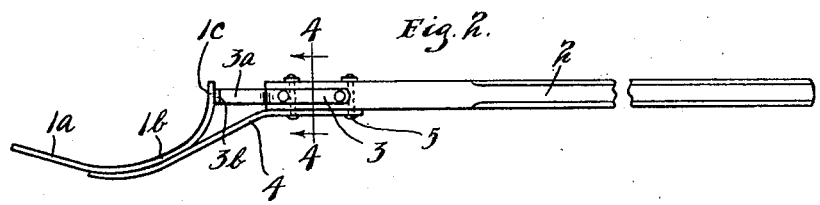
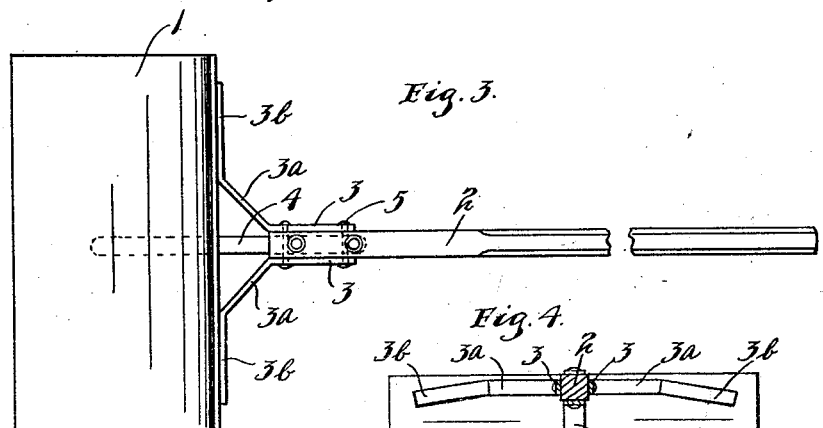
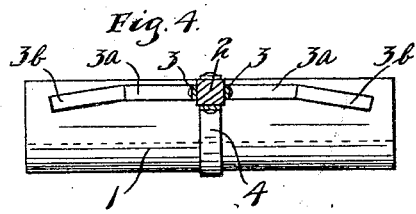
INVENTOR.
CLATON E. BURKE.
BY HIS ATTORNEY.
James F. Williamson

Patented June 30, 1925.

1,544,370

UNITED STATES PATENT OFFICE.

CLATON E. BURKE, OF MINNEAPOLIS, MINNESOTA, ASSIGNOR TO B. B. SPECIALTY COMPANY, OF MINNEAPOLIS, MINNESOTA, A CORPORATION OF MINNESOTA.

SNOW PUSHER.

Application filed March 24, 1924. Serial No. 701,343.

*To all whom it may concern:*

Be it known that I, CLATON E. BURKE, a citizen of the United States, residing at Minneapolis, in the county of Hennepin and State of Minnesota, have invented certain new and useful Improvements in Snow Pushers; and I do hereby declare the following to be a full, clear, and exact description of the invention, such as will enable others skilled in the art to which it appertains to make and use the same.

This invention relates to a pushing implement adapted to scrape and push material from a flat surface. While such an implement is capable of many uses, it is commonly used for scraping snow or slush from the side walks and also for scraping manure from stables or troughs in stable floors. It is desirable to have such an implement of simple and rugged construction and so formed that it can easily be kept clean and sanitary.

It is an object of this invention, therefore, to provide such a pushing implement of extremely simple, strong and durable construction and one which can be easily and inexpensively manufactured.

It is a further object of the invention to provide such a pushing implement having a surface curved throughout the greater portion of its extent and the forward or operative surface of which is smooth and unobstructed.

It is another object of the invention to provide such a implement formed from a substantially rectangular strong metal plate having a flat portion at its forward edge but curved throughout the greater portion of its extent and having a quite narrow flat portion at its rear edge.

It is also an object of the invention to provide such an implement as above set forth together with a handle therefor extending centrally and rearwardly therefrom substantially normal to the rear flat portion of said plate, which handle is connected to the plate by a plurality of brace members attached to the rear portion of the plate in a manner so that there are no fastening means projecting at the forward portion of the plate.

These and other objects and advantages of the invention will be fully set forth in the following description made in connection with the accompanying drawings in which like reference characters refer to the same parts throughout the different views, and in which Fig. 1 is a view in side elevation of the device showing the same in operative position;

Fig. 2 is a view in side elevation of the device showing a slightly different means for connecting the handle;

Fig. 3 is a view in plan elevation of the device, as shown in Fig. 2; and

Fig. 4 is a view in vertical section taken on the line 4—4 of Fig. 2, as indicated by the arrows.

Referring to the drawings, the device comprises a plate member 1 of metal and which is preferably made of good steel. While the shape of the plate 1 may be varied, in the embodiment of the invention illustrated, the same is shown as substantially rectangular. Said plate is provided with a flat plane portion 1ª adjacent its forward operative edge and said plate is curved, as shown at 1ᵇ, throughout the greater portion of its area, said curve extending tangent to the flat portion 1ª and to the narrow rear flat portion 1ᶜ, the latter portion being disposed in a plane substantially at right angles to the portion 1ª, or at slightly less than a right angle thereto. A handle 2 is provided which extends rearwardly from the plate 1 substantially alined with the rear edge of the plate and extending centrally and substantially normal thereto. While said handle may be of various shapes, in the embodiment of the invention illustrated, the same is shown as of octagonal shape in cross section at its outer end, and of square or rectangular cross section at its inner end. The handle 2 is connected to the plate 1 by a plurality of connecting bars or braces 3 and 4. The bars 3 contact and extend along the side portions of the handle 2, diverge from the end thereof at an angle of substantially 45 degrees and then extend along the rear side of the plate 1 and contact therewith. The diagonal portions 3ª of the bars 3 extend in planes substantially parallel to the rear edge of plate 1 but their ends 3ᵇ of said bars which are in contact with the plate extend downwardly at a slight angle to the rear edge of the plate. Owing to the curved surface of the plate 1 it is found that a better contact is had therewith by thus turning downward the ends of the bars 3. The bars 3 are connected to the handle 2 by suitable fastening means, such as rivets shown in Fig. 2 or by headed and nutted bolts such as shown in Fig. 1. The bar 4 extends along the bottom of the handle 2 in contact therewith and centrally thereof and is bent adjacent the end of the handle to extend downwardly tangent to the rear surface of plate 1, said bar then extending around the curved portion of said plate in contact therewith. The bar 4 is secured to handle 2 either by rivets, such as shown in Fig. 2 or by the headed and nutted bolts shown in Fig. 1. The bars 3 and 4 are secured to the plate 1 preferably by spot welding. Said bars, however, could be secured in any suitable manner which would provide a smooth forward surface for plate 1 such as by countersunk rivets.

In operation, the implement will be held substantially in the position shown in Fig. 1 and pushed along the surface, such as illustrated at 6. The scraped material will slide up the plate 1 and can either be shoveled away or allowed to slide on the plate and be directed in front of the same by the upwardly curved portion of the plate. The forward surface of the plate 1 being entirely smooth does not offer any obstruction to the material handled and is, furthermore, easily kept in clean condition. The absence of projecting fastening means for the bars 3 and 4 also aids in keeping the implement in clean and sanitary condition. While headed rivets are desirable in many cases for connecting the handle 2, headed and nutted bolts are often used in order to facilitate packing of the implement for shipment, as the space can better be utilized by packing the blades and handles separately. The bars 3 and 4 are efficiently placed to provide a strong and durable implement and the structure is one which can be easily and inexpensively produced.

From the above description it will be seen that applicant has provided a simple and efficient pushing and scraping implement and one which has a high degree of utility. The device has been thoroughly demonstrated in actual practice and found to be very successful and efficient. The same is being commercially used and is meeting with great success.

It will, of course, be understood, that various changes may be made in the form, details, arrangement and proportions of the device without departing from the scope of applicant's invention, which, generally stated, consists in a device capable of carrying out the objects above set forth, such as shown and described and defined in the appended claims.

What is claimed is:

1. A pushing implement comprising a substantially rectangular plate curved for the greater portion of its width about an axis parallel to the longitudinal axis thereof and having a flat portion adjacent its forward edge tangent to said curved portion, the forward surface of said plate being smooth and unobstructed, a handle extending rearwardly and centrally from and substantially normal to and in alinement with the rear edge of said plate, and central and side brace members secured to and extending from said handle and lying flat against and secured to the rear surface of said plate.

2. A pushing implement comprising a substantially rectangular plate curved for the greater portion of its width about an axis parallel to the longitudinal axis thereof and having a flat portion adjacent its forward edge tangent to said curved portion, the forward surface of said plate being smooth and unobstructed, a bar extending transversely of said plate at the rear thereof in contact therewith and extending away from said plate on a line tangent thereto, said bar then being bent to extend substantially normal to the rear edge of said plate, bars extending longitudinally at the rear of said plate in contact therewith adjacent its rear edge, then converging rearwardly away from said plate and then bent to extend substantially normal to said rear edge and a handle contacted on three sides by said bars and secured thereto.

3. A pushing implement comprising a substantially rectangular plate having a flat forward portion curved upwardly adjacent its rear portion with a narrow flat portion adjacent its rear edge extending substantially at right angles to said flat forward portion, bar members contacting the rear surface of said plate adjacent its rear edge extending longitudinally thereof and converging rearwardly away from said plate, a bar contacting the rear surface of and extending transversely and substantially centrally thereof and extending away from said surface, and a handle secured to all of said bars, said bars being secured to said plate so as to retain a smooth unobstructed forward surface thereon.

In testimony whereof I affix my signature.

CLATON E. BURKE.